United States Patent
Nakamura (10) Patent No.: US 7,641,562 B2
(45) Date of Patent: Jan. 5, 2010

(54) BOOT FOR UNIVERSAL SHAFT COUPLING

(75) Inventor: Saburo Nakamura, Nagoya (JP)

(73) Assignee: Tokue Inc., Chiryu-shi (JP)

( * ) Notice: Subject to any disclaimer, the term of this patent is extended or adjusted under 35 U.S.C. 154(b) by 292 days.

(21) Appl. No.: 10/575,877

(22) PCT Filed: Oct. 4, 2004

(86) PCT No.: PCT/JP2004/014587

§ 371 (c)(1),
(2), (4) Date: Apr. 17, 2006

(87) PCT Pub. No.: WO2005/038279

PCT Pub. Date: Apr. 28, 2005

(65) Prior Publication Data

US 2007/0142116 A1    Jun. 21, 2007

(30) Foreign Application Priority Data

Oct. 20, 2003  (JP)  ............................. 2003-359487
Dec. 22, 2003  (JP)  ............................. 2003-425709

(51) Int. Cl.
*F16D 3/84*   (2006.01)
(52) U.S. Cl. ...................... 464/175; 403/381
(58) Field of Classification Search ......... 464/173–175; 403/50, 51, 339, 340, 364, 381; 277/636; 138/128
See application file for complete search history.

(56) References Cited

U.S. PATENT DOCUMENTS 2,226,388 A * 12/1940 Richter ..................... 403/50 X (Continued)

FOREIGN PATENT DOCUMENTS

CA    2 580 837    12/2001

(Continued)

OTHER PUBLICATIONS

"Sealing Fastener Joins Rubber Boots," Machine Design, Penton Media, Cleveland, OH, vol. 68, No. 12, Jul. 11, 1996, p. 62.

(Continued)

*Primary Examiner*—Greg Binda
(74) *Attorney, Agent, or Firm*—Edwards Angell Palmer & Dodge LLP (57) ABSTRACT

A boot for a universal shaft coupling, by which an improvement of an assembling workability can be expected, and an improvement of a sealing performance can be expected. The boot for the universal shaft coupling is formed by a rubber elastic body, and separated portions (22) are formed linearly along a generatrix. A fastener pair (26) is arranged in both sides of the separated portions (22) so as to form a seal portion. The fastener pair (26) is constituted by an occluding portion (32) formed in one end edge of the separated portion (22) and provided with a bulge locking portion (32*a*) in a leading end, and an occluded portion (34) formed in another end edge of the separated portion (22) and provided with an occluding groove (33) occluding with the bulge locking portion (32*a*). A guide fin (36) is provided in an inner side of the occluding groove (33) on a separated portion end surface (22*b*) in a side forming the occluded portion of the separated portion (22), in a side of a crest portion (28) of a bellows portion (24). The guide fin (36) is provided a guide surface (40) at a position partly overlapping the occluding portion (32) at a time of facing to the occluding portion (32).

6 Claims, 10 Drawing Sheets

U.S. PATENT DOCUMENTS

| | | | |
|---|---|---|---|
| 3,623,340 A * | 11/1971 | Maas | 464/175 |
| 4,676,513 A | 6/1987 | Tiegs et al. | |
| 5,222,746 A | 6/1993 | Van Steenbrugge | |
| 5,431,601 A | 7/1995 | Nakamura | |
| 6,772,568 B2 * | 8/2004 | Thiers et al. | 403/381 X |

FOREIGN PATENT DOCUMENTS

| | | |
|---|---|---|
| DE | 706519 | 5/1941 |
| DE | 33 09 940 | 4/1984 |
| EP | 0 543 011 A1 | 5/1993 |
| EP | 1 101 982 A1 | 5/2001 |
| JP | 60-7461 | 1/1985 |
| JP | 4-362377 | 12/1992 |
| JP | 5-50921 | 7/1993 |
| JP | 08-261324 | 10/1996 |
| JP | 2627832 | 4/1997 |
| JP | 09-119522 | 5/1997 |
| JP | 9-177972 | 7/1997 |
| JP | 2714635 | 11/1997 |
| JP | 10-054493 | 2/1998 |
| JP | 11-336897 | 12/1999 |
| JP | 2000-297825 | 10/2000 |
| JP | 2004-156643 | 6/2004 |
| JP | 2005-3049 | 1/2005 |
| WO | WO 92/21260 A1 | 12/1992 |
| WO | WO-99/39123 | 8/1999 |
| WO | WO 00/08361 A1 | 2/2000 |

OTHER PUBLICATIONS

Supplementary European Search Report dated Aug. 28, 2009, issued in EP 04 79 1999.

* cited by examiner

BOOT FOR UNIVERSAL SHAFT COUPLING

BACKGROUND OF THE INVENTION

1. Field of the Invention

The present invention relates to a boot for a universal shaft coupling (hereinafter, refer simply to as "boot") which is used as a protecting member in a universal shaft coupling portion of a motor vehicle, a machine tool, a construction machine, various industrial machines and the like and is made of a rubber elastic body.

In more detail, the present invention relates to a boot which is separated in a vertical direction so as to be easily maintained and has a fastener pair arranged in the separated portions.

2. Description of the Related Art

In conventional art, as the separated type boot, a boot for a universal shaft coupling having the following structure has been proposed by the applicant of the present invention.

A boot for a universal coupling is formed by a rubber elastic body, forming a bellows portion between a small-diameter ring portion and a large-diameter ring portion, and having linear separated portions formed from the small-diameter ring portion to the large-diameter ring portion, the separated portions being formed as a thick portion and having a seal fastener.

The seal fastener is constituted by a band-like occluding portion formed along an end edge of the one separated portion and provided with a bulge locking portion in a leading end, and a band-like occluded portion provided with a occluding groove occluding with the occluding portion along an end edge of another separated body.

On the other hand, in the boot for the universal shaft coupling having the structure mentioned above, it is required to further improve a sealing performance and an assembling workability.

In this case, although an inventiveness of the present invention is not affected, patent documents 2 and 3 exist as a separated type boot for a universal shaft coupling.

Patent document 1 Japanese Patent No. 2714635
Patent document 2 Japanese Unexamined Patent Publication No. 8-261324
Patent document 3 Japanese Unexamined Patent Publication No. 9-119522

SUMMARY OF THE INVENTION

Taking the above matters into consideration, an object of the present invention is to provide a separated type boot for a universal shaft coupling, by which an improvement of an assembling workability can be expected, and an improvement of a sealing performance can be expected.

One of the boots for the universal shaft coupling in accordance with the present invention achieves the object mentioned above on the basis of the following structure.

A boot for a universal shaft coupling is formed by a rubber elastic body, forming a bellows portion between a small-diameter ring portion and a large-diameter ring portion, and having linear separated portions formed along a generatrix from the small-diameter ring portion to the large-diameter ring portion, the separated portions being formed thick in both sides and having a fastener pair. A portion between the separated portions is thinner than the separated portions and has a substantially uniform thickness so as to form a general portion connected in a peripheral direction.

The fastener pair is constituted by a band-like occluding portion formed along one end edge of the separated portion and provided with a bulge locking portion in a leading end, and a band-like occluded portion provided with a occluding groove occluding with the occluding portion along another end edge of the separated portion.

A guide fin provided with a guide surface at a position partly overlapping the occluding portion at a time of facing to the occluding portion, is formed so as to protrude only to a crest portion side of the bellows portion, in an inner side of the occluding groove on an occluded portion side end surface of the separated portion.

Because the guide fin exists in the occluded portion side, an occluding workability of the occluding portion with respect to the occluding groove is improved. Further, because the guide fin is pressed and compressed in the occluding portion side end surface of the separated portion, a sealing performance is improved.

In the structure mentioned above, it is desirable that a height of the guide fin is gradually reduced from the crest portion toward both side valley portions. Accordingly, a sealing performance can be easily secured.

Further, in the structure mentioned above, the structure may be made such that a fin receiving groove is formed in an inner side of the bulge locking portion on the occluding portion side end surface of the separated portion, in correspondence to the guide fin.

In each of the structures mentioned above, the structure is generally made such that a pinching insert formed by a linear spring member and having an eggplant horizontal cross sectional shape substantially with no corner portion is buried in an outer peripheral portion of the occluding groove, a spring pinching force is applied to a portion between opening end portions of the occluded portion, and a pinched insert formed by a linear spring member and having a wave-shaped flat surface is buried in the occluding portion.

In accordance with the structure mentioned above, an occluding workability of the occluding portion is improved in cooperation with each of the structures.

Further, in the structure mentioned above, it is generally desirable that the separated portion is bulged to the inner side so as to be formed as a thick portion.

A boot in accordance with another aspect of the present invention achieves the object mentioned above on the basis of the following structure.

A boot for a universal shaft coupling has linear separated portions formed along a generatrix from the small-diameter ring portion to the large-diameter ring portion, the separated portions being formed thick in both sides and having a fastener pair, and a portion between the separated portions being thinner than the separated portions and being in a substantially uniform thickness so as to form a general portion connected in a peripheral direction.

The fastener pair is constituted by a band-like occluding portion formed along one end edge of the separated portion and provided with a bulge locking portion in a leading end, and a band-like occluded portion provided with a occluding groove occluding with the occluding portion along another end edge of the separated portion.

A grease return rib is provided in a first inner peripheral surface in a side of the large-diameter ring portion.

On the basis of the structure provided with the grease return rib as mentioned above, it is possible to inhibit the charged grease from making an intrusion into the inner side of the bellows portion (the first crest portion) from the large-diameter ring portion side. Accordingly, an amount of the grease reaching the seal portion formed by the fastener pair is reduced, so that it is possible to inhibit the grease from leaking from the seal portion. At this time, it is desirable that a height of the grease return is set from 0.5 to 2.5 mm and desirably inner diameter of the large-diameter ring portion is 50 to 100 mm.

Further, in the structure mentioned above, it is desirable that both side cross sections of a base portion of the bulge locking portion in the occluding portion are formed as an angular portion, and both side cross sections of a base portion of the bulge receiving portion in the occluded groove correspondence to the bulge locking portion in the occluded portion are formed as curved portion compressing the angular portion. Accordingly, even when the grease reaches the occluding seat portion over the grease return, it is possible to inhibit the grease from leaking.

DETAILED DESCRIPTION OF AN EXEMPLARY EMBODIMENT

A description will be given below of one embodiment in accordance with the present invention on the basis of an illustrated embodiment, however, a boot in accordance with the present invention is not limited to this structure. In other words, various design changes can be executed within a scope of the present invention.

Figure 1:
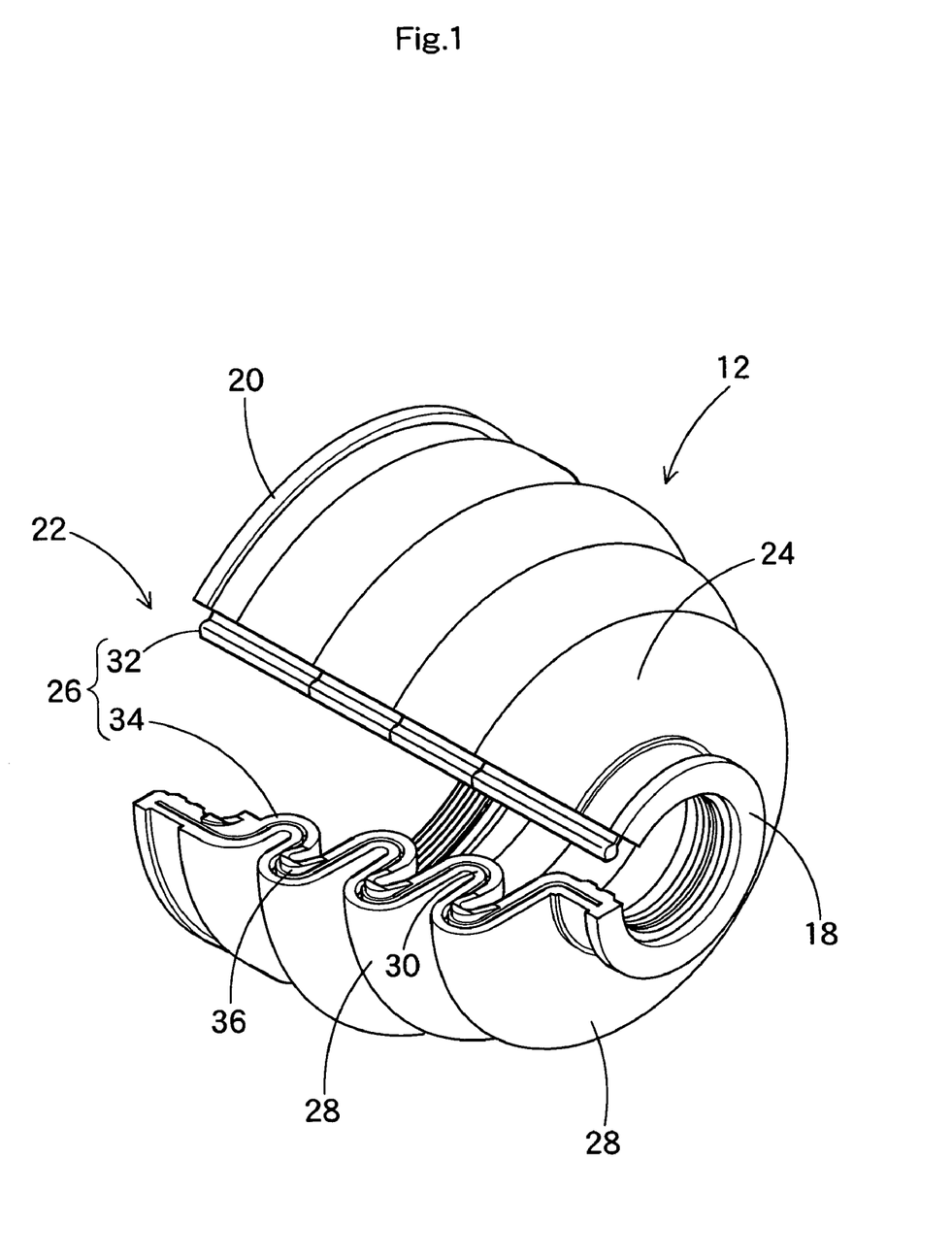
FIG. 1 is a perspective view showing one embodiment (an embodiment 1) of a boot in accordance with the present invention.
Figure 2:
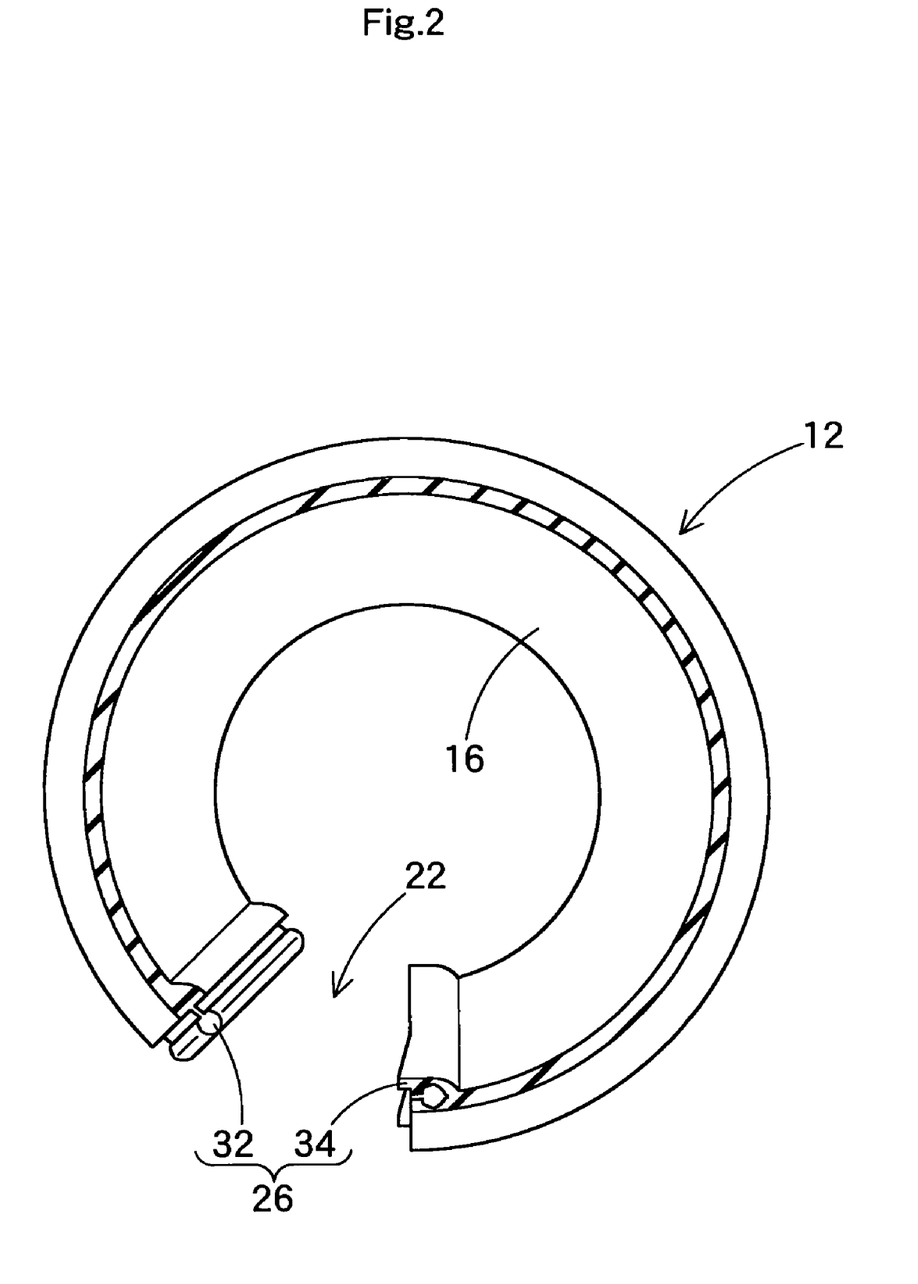
FIG. 2 is a cross sectional view in a peripheral direction in a second crest portion of the boot in FIG. 1 (in the case of seeing from a side of a small-diameter ring portion)

A boot 12 in accordance with the present embodiment is applied to the vertical separated type (generatrix direction separated type) boot shown in FIGS. 1 and 2. In other words, a basic aspect can be described in correspondence to the boot in accordance with the conventional aspect as described below.

The boot 12 in accordance with the present invention is formed by a rubber elastic body, and is structured such that a bellows portion 24 is formed between a small-diameter ring portion 18 and a large-diameter ring portion 20. Further, separated portions 22 are formed in a linear shape (in an axial direction) along a generatrix from the small-diameter ring portion 18 to the large-diameter ring portion 20, both sides of the separated portions 22 are formed thick, and a fastener pair 26 is arranged in the both sides. Further, a portion between the separated portions 22 is formed thinner than the separated portions 22 and approximately in a uniform thickness so as to form a general portion 16 connected in a peripheral direction.

The boot 12 (a grease is generally charged within the boot 12) in accordance with the present invention is formed in an expanded state in accordance with an injection molding by using a rubber elastic body material having a grease resistance, in specific, a rubber material such as a chloroprene rubber, an acrylic rubber or the like.

In this case, the rubber elastic body includes a thermoplastic elastomer having a rubber elasticity in addition to a natural rubber and a synthetic rubber.

The small-diameter ring portion 18 and the large-diameter ring portion 20 bear a part in a fixing region at a time of attaching the boot 12 to the universal shaft coupling region. Further, the bellows portion 24 bears apart in surrounding the attached region after attaching the boot 12 to the universal shaft coupling region so as to provide protection from water and dust. In the present embodiment (refer to FIG. 1), the numbers of crest portions 28 and valley portions 30 in the bellows portion are both set to three, however, they may be set to two or less or four or more, as far as the bellows shape is employed. In the following description of the present description, the crest portions are shown as a first crest portion, a second crest portion, a third crest portion, . . . in order from a side close to the large-diameter ring portion 20. In the same manner, the valley portions are shown as a first valley portion, a second valley portion, a third valley portion, . . . in order from a side close to the large-diameter ring portion 20.

The separated portions 22 are formed in the boot 12 for the purpose of making an attaching and detaching work of the boot 12 with respect to the universal shaft coupling region easy. Because the boot 12 is a protecting member, the boot 12 is frequently replaced periodically. Accordingly, this structure is useful.

In other words, if the separated portions 22 are not formed, it is necessary to insert the boot 12 to the universal shaft coupling region from a side of the small-diameter ring portion 18 or a side of the large-diameter ring portion 20 in the attaching work, so that it is necessary to disassemble the universal shaft coupling region to a state in which the boot 12 can be attached. However, because the separated portions 22 are formed, the boot 12 can be attached so as to pinch the universal shaft coupling region. Accordingly, particularly at a time of attaching to a steering unit or the like, the disassembling work and an adjusting work of the universal coupling caused by the disassembling work are not required.

Further, in order to close the separated portions 22, both sides of the separated portions 22 are formed thick, and a fastener pair 26 is arranged there. The fastener pair 26 is constituted by an occluding portion (a male portion of the fastener pair) 32 and an occluded portion (a female portion of the fastener pair) 34.

The occluding portion 32 is formed in a band shape in a state of protruding along one end edge 22a of the separated portions 22 toward another end edge, and is provided with a bulge locking portion 32a in a leading end. On the other hand, the occluded portion 34 is provided with an occluding groove 33 engageable with the bulge locking portion 32 and formed in a keyhole cross sectional shape.

Figure 3:
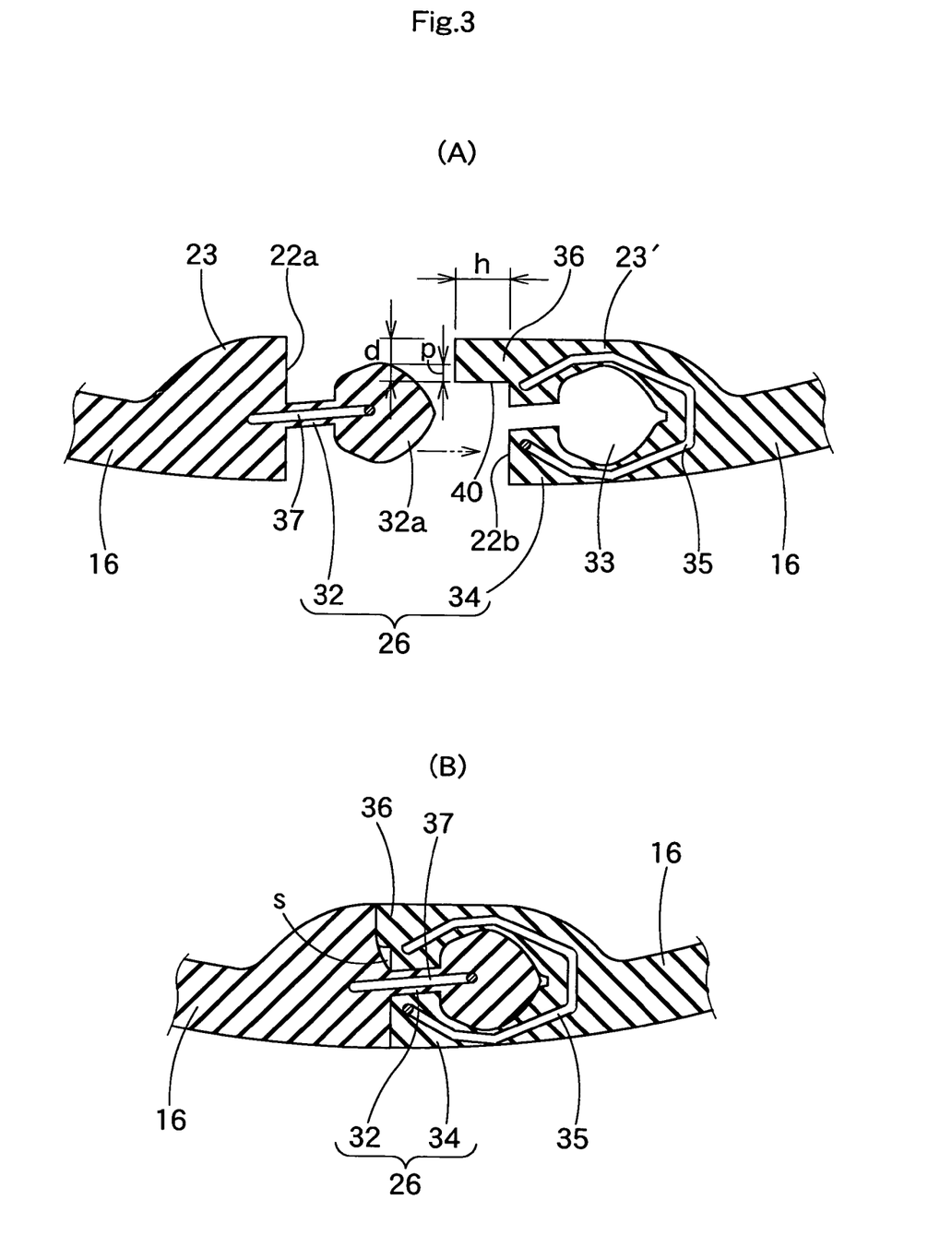
FIG. 3A is an enlarged end elevational view before being occluded, showing a fastener pair forming portion in FIG. 1.
FIG. 3B is an enlarged end elevational view after being occluded, showing the same portion in FIG. 3A.
Figure 4:
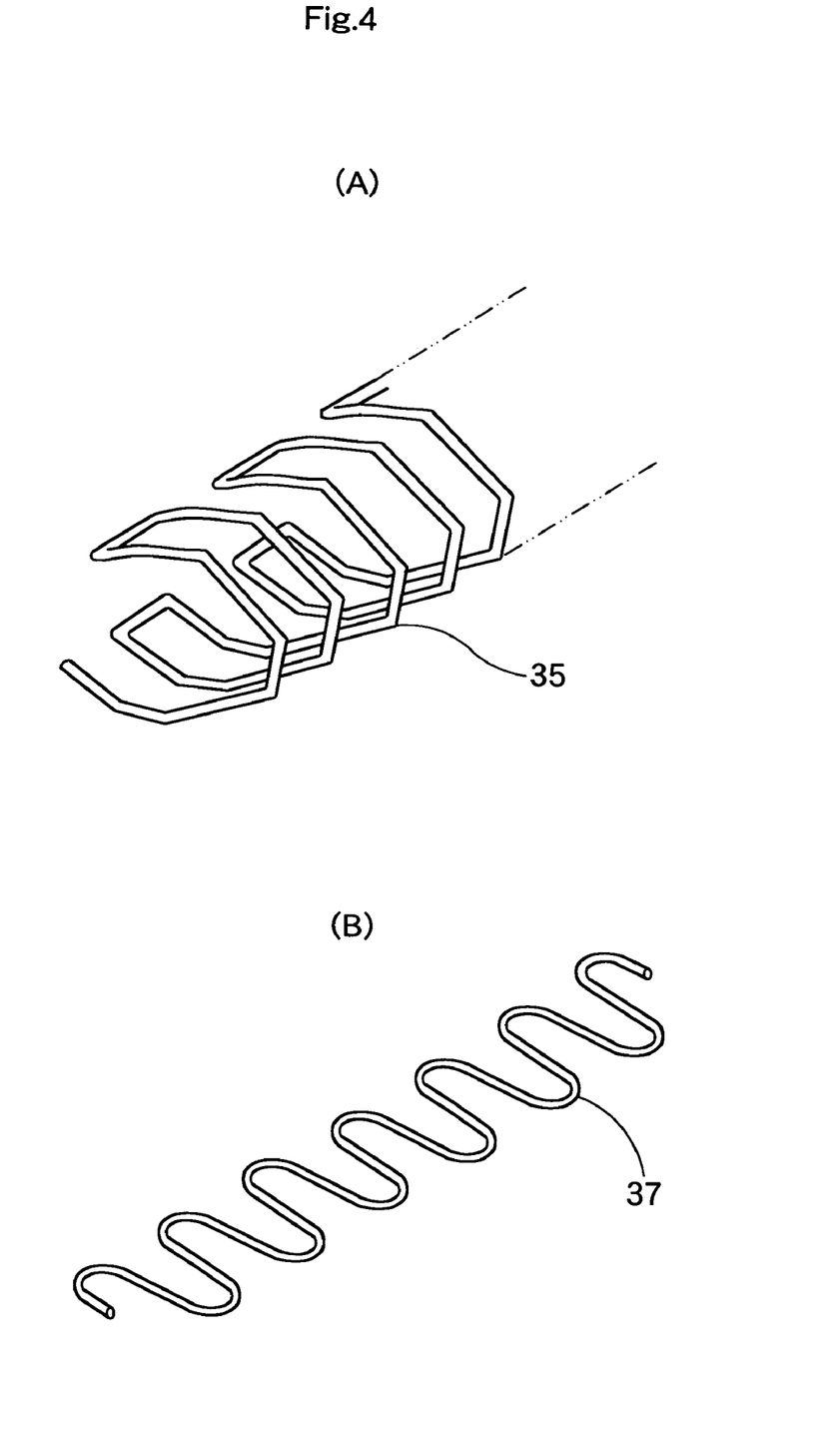
FIG. 4A is a perspective view of a pinching insert in FIG. 3A.
FIG. 4B is a perspective view of a pinched insert in FIG. 3B.

Further, in the present embodiment, in view of an occluding workability and a seal stability after the occlusion, a pinching insert 35 is buried in an outer peripheral portion of the occluding groove 33 of the fastener pair 22, and a pinched insert 37 is buried in the occluding portion 32 (refer to FIGS. 3 and 4).

The pinching insert 35 forms a groove space tapered toward an opening side by bending a linear spring member in a zigzag occlusion shape, having in an eggplant horizontal cross sectional shape substantially having no corner portion, and applies a spring pinching force to a portion between the opening end portions of the occluded portion 34 (refer to FIG. 4A).

Further, the pinched insert 37 is formed by the linear spring member, has a wave-shaped flat surface, and applies a rigidity in an occluding direction to the occluding convex groove portion 32 (refer to FIG. 4B).

When occluding (engaging) the fastener pair 26, the boot 12 is formed in a peripherally continuous shape including the general portion 16 and the separated portions (the thick portions) 22. When closing the separated portions 22, the fastener pair 26 is in a state of being buried (implanted) in the separated portions 22 formed thick, and secures a sealing performance required for the protecting member.

In the boot 12 having the structure mentioned above, generally, an inner diameter of the small-diameter ring portion 18 is set to about 20 to 40 mm, an inner diameter of the large-diameter ring portion 20 is set to about 70 to 120 mm, and a pitch of the crest portion of the bellows portion is set to about 15 to 20 mm. Further, a thickness of the general portion 16 is set to about 2 mm. At this time, a difference in thickness between the separated portion (the thick portion) 22 and the general portion 16 is normally set to about 1.5 to 3 mm.

Figure 5:
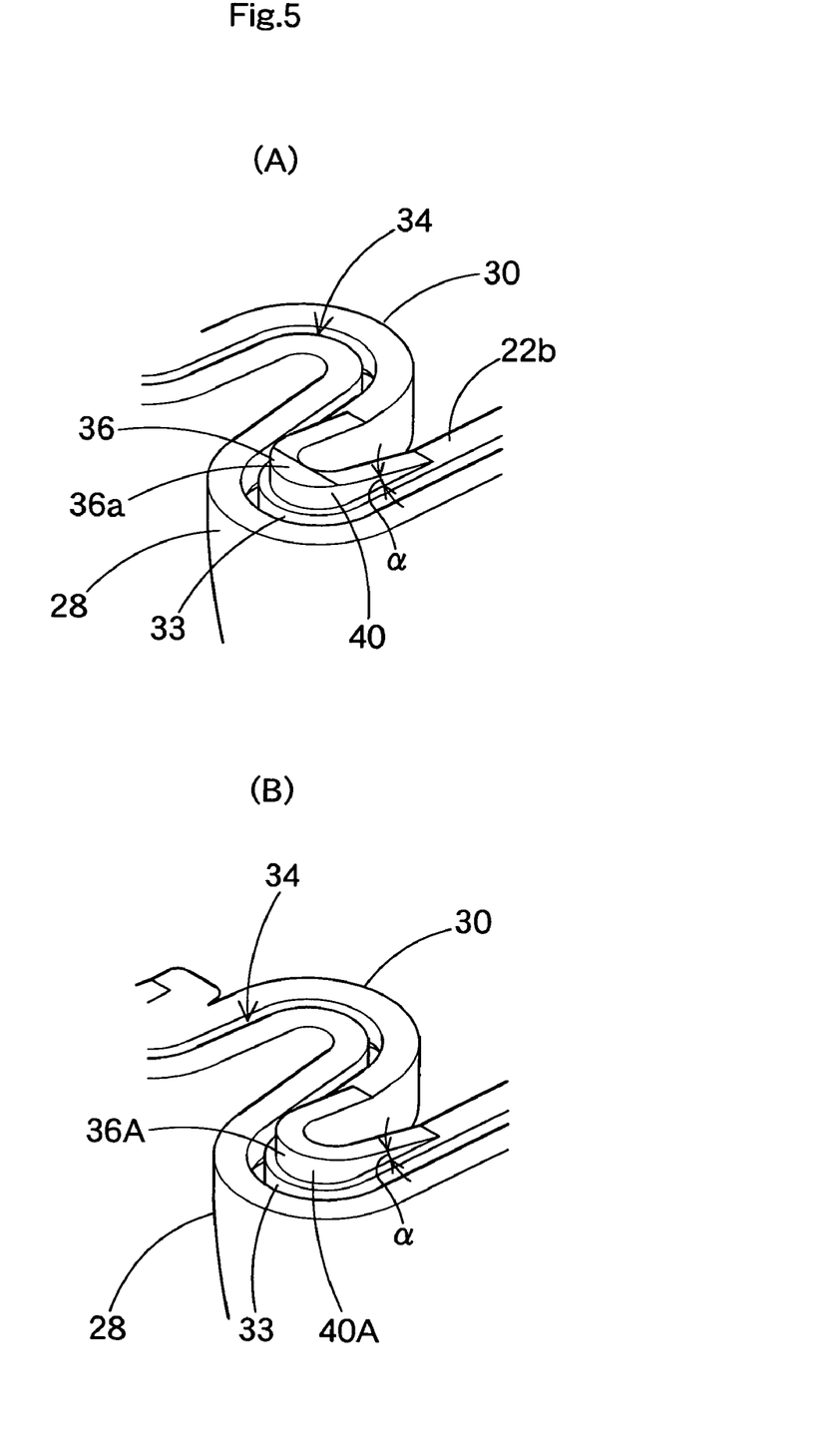
FIG. 5A is an enlarged perspective view of a separated portion forming a guide fin in FIG. 3.
FIG. 5B is an enlarged perspective view showing a modified aspect of FIG. 5A.

Further, in the present embodiment, a guide fin 36 provided with a guide surface 40 existing at a position partly overlapping at a time of facing to the occluding portion 32 is formed in a inner side of the occluding groove 33 on the end surface 22b in a side forming the occluded portion 34 in the separated portions 22 (a position close to an inner wall of the boot 12) so as to protrude only to the crest portion side of the bellows portion 24 (refer to FIGS. 3 and 5).

Figure 7:
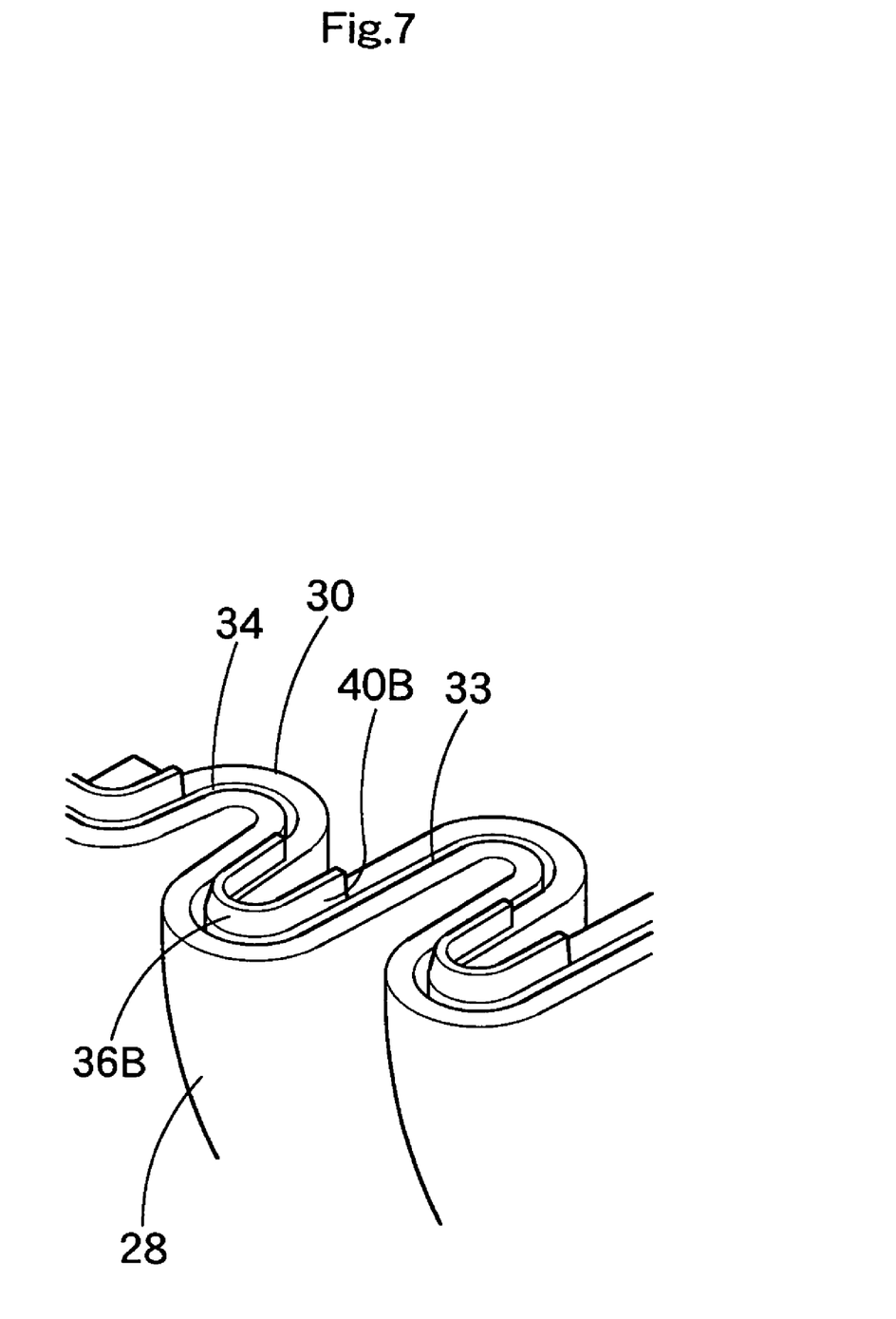
FIG. 7 is an enlarged perspective view of a separated portion forming a guide fin in FIG. 6.

In this case, a height of the guide fin 36 is gradually reduced from the crest portion (mountaintop portion) 28 toward both side valley portions 30. In this case, in the present embodiment, as shown in FIG. 7 mentioned below, the guide fin 36 may be extended at the uniform height, or the guide surface 40 may be given a slope. However, there is a risk that the following problem is generated.

In the case that the guide fin 36 is formed at the uniform height, a force that the guide fin 36 pressurizes the occluding portion side end surface 22a of the separated portions 22 is increased, whereby the force in an opening direction is applied to the fastener pair at a time of attaching and using the boot, thereby applying an adverse effect to the occluding workability. Further, a gap on the basis of the step is generated in a terminal end of the guide fin 36, and there is a risk that an adverse effect is applied to the sealing performance.

In this case, a length of the guide fin 36 is set such that the guide fin 36 is terminated short of the valley portion 30, that is, just before the linear portion is terminated. In other words, the guide fin 36 is formed so as to occupy about a half to one fifth with respect to a total length of an inner side of the crest portion 28 of the bellows portion 24, and desirably about a half. Further, the angle α of inclination of the guide fin 36 is normally set from 1 to 30 degrees, and desirably from 5 to 20 degrees, and a height (a maximum height) h of the guide fin 36 is set to 0.5 to 2 mm.

It is desirable that a thickness d of the guide fin 36 is set to about one third to one fourth with respect to the maximum thickness of the separated portions 22 in the seal portion, and a step portion is formed with respect to an opening end 33a of the occluding groove 33 in the occluded portion side end surface 22b of the separated portions 22. Accordingly, a guiding operation of the guide fin 36 can be expected to be smooth. Further, it is desirable that a lap margin between the guide fin 36 and the bulge locking portion 32a, that is, a distance p of the bulge locking portion 32a of the guide surface 40 is normally set from 0 to 1 mm in view of the guiding performance or the like.

Because the guide fin 36 exists in the occluded portion side end surface 22b of the separated portions 22, an occluding workability of the occluding portion 32 with respect to the occluding groove 33 is improved. In other words, when occluding the fastener pair 26 as shown in FIG. 3, the fastener pair can be smoothly guided (introduced) to the occluding groove 33 formed in the occluded portion 34 by bringing the bulge locking portion formed in the occluding portion 32 into contact with the guide surface 40 of the guide fin 36 so as to position, and sliding the bulge locking portion along the guide surface 40 in the fastener pair 26 closing direction, whereby it is possible to rapidly and easily execute the occluding work. In this case, the occluding work is normally executed from the large-diameter ring portion 20 side toward the small-diameter ring portion 18 side sequentially.

After occluding the fastener pair 26, the guide fin 36 contributes to an improvement of the sealing performance as described below.

Because the crest portion 28 of the bellows portion 24 forming the guide fin 36 has a larger diameter than the valley portion 30 of the bellows portion, a deformation caused by a bending motion of the bellows portion 24 is larger in the crest portion 28 than in the valley portion 30. In other words, in the inner side of the valley portion 30, a gap reaching the occluding portion 33 providing region of the separated portion end surface 22a is not generated in the occluding portion 33 side, however, in the inner side of the crest portion 28, such a gap is sometimes generated. On the other hand, the gap generated between the separated portions 22 of the bellows portion 24 is reciprocated and propagated between the valley portion 30 and the crest portion 28, on the basis of the bending motion of the universal coupling. Further, a centrifugal effect caused by the rotation of the universal shaft coupling is applied to the grease.

Accordingly, there has been a risk that the grease making an intrusion into the gap generated in the valley portion 30 conventionally moves to the crest portion 28 side and leaks out (oozes out) to an outer side of the bellows portion. However, in accordance with the present embodiment, because the guide fin 36 corresponding to the rubber elastic body exists, an inner gap s of the crest portion 28 is closed (sealed) as shown in FIG. 3B. Accordingly, the grease is prevented from making an intrusion into the inner gap s of the crest portion 28, so that there is hardly a risk that the grease moving to the crest portion 28 leaks out (oozes out) to the outer side of the bellows portion 24.

FIG. 5B shows a partial perspective view of a modified aspect of the guide fin 36 in the embodiment mentioned above. The guide fin 36A in accordance with the modified aspect is structured such that a leading end chamfer portion 36a is omitted in the guide fin 36 in FIG. 5A.

In this case, the chamfer portion 36a is provided so as to prevent the opening (the gap) in the occluding portion from becoming large in the case that the boot has a large diameter (for example, equal to or more than a large-diameter ring portion 80 φ).

Figure 6:
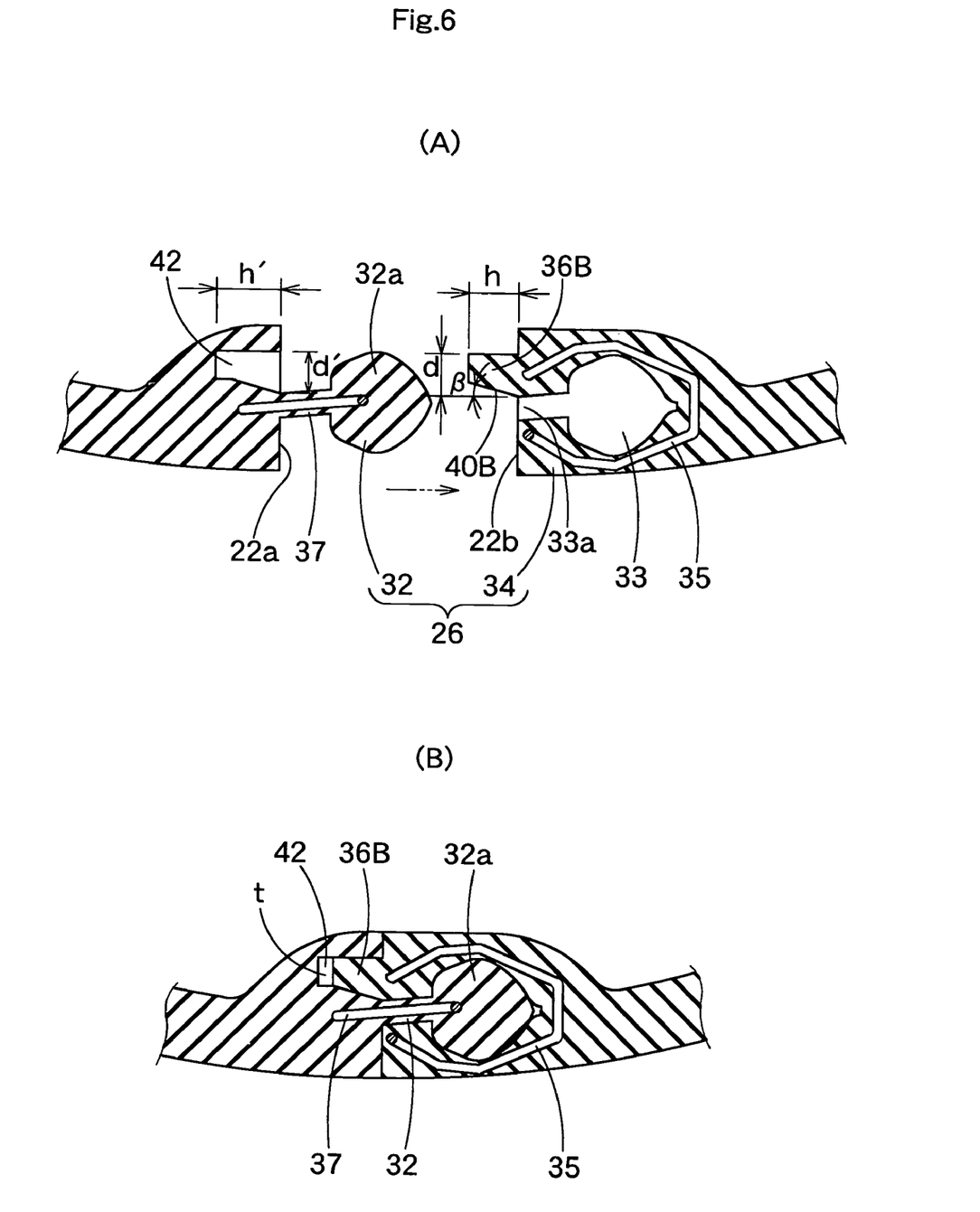
FIG. 6A is an enlarged end elevational view before being occluded, showing a fastener pair forming portion in accordance with a modified aspect of the first Embodiment.
FIG. 6B is an enlarged end elevational view after being occluded, showing the same portion in FIG. 6A.

FIGS. 6 to 7 show another embodiment in the boot in accordance with the present invention.

The present embodiment is provided with a guide fin 36B formed in the end surface 22b forming the occluded portion 34 in the separated portions 22, and a fin receiving groove 42 formed in a rising portion inner side of the occluding portion 32 in the end surface 22a forming the occluding portion 32.

In this case, in the illustrated embodiment, a height of the guide fin 36B is formed at a uniform height and a length thereof is formed so as to occupy about a half to one fifth with respect to a total length of the crest portion of the bellows portion 24, and desirably about a half.

Further, although it is not inevitable, the guide surface 40B of the guide fin 36B is formed as an inclined surface so as to improve a guiding performance with respect to the occluding portion 32 and a fitting performance and a sealing performance with respect to the fin receiving groove 42, in the present embodiment. At this time, an angle β of inclination is normally set from 1 to 15 degrees (desirably from 5 to 10 degrees). In an illustrated embodiment, because the guide surface 40B is formed as the inclined surface, no step is generated between the guide surface 40B of the guide fin 36B and the occluding groove opening end 33a. However, the step may be provided as in the embodiment mentioned above.

Because the fin receiving groove 42 bears a part in receiving the guide fin 36B in a state in which the fastener pair is closed, it is preferable to employ a specification having a groove width and depth corresponding to the shape of the guide fin 36B. However, because the guide fin is in a state of being pressed and compressed within the fin receiving groove 42 by making a groove width d' of the fin receiving groove 42 slightly smaller than the thickness d of the guide fin 36B, it is possible to secure a better sealing performance in the same manner as the embodiment mentioned above.

Further, in the case of the present embodiment forming the fin receiving groove 42, because the guide fin 36B does not press the end surface 22a in the side forming the occluding portion of the separated portions 22 as in the embodiment mentioned above, but is in the state of being compressed by a wall surface of the fin receiving groove 42, the force in the direction of opening the fastener pair is not generated at a time when the boot is attached and used. Accordingly, it can be expected that a high sealing performance is secured without reducing the occluding force of the fastener.

In this case, in FIG. 6, a depth h' of the fin receiving groove is set to be larger with respect to the height h of the guide fin 36B. In accordance with the structure mentioned above, in the case that the separated portions 22 are closed, it is possible to form a grease trap t in a bottom portion of the fin receiving groove 42 even if the grease makes an intrusion into the crest portion 28 side from the valley portion 30 side. It is possible to effectively prevent the grease from leaking out (oozing out) to the outer portion of the bellows portion 24, by forming the grease trap t.

A depth of the grease trap, that is, (h'−h) is normally set from 0.5 to 1.0 mm.

In this case, in the present invention, as shown in FIGS. 3 and 6, it is preferable that the separated portions 22 bulge to the inner side with respect to the general portion 16 of the boot 12 so as to form a thick portion.

In the case that the separated portions 22 bulge to the inner side so as to be formed thick, the following effect can be achieved in comparison with the case that the separated portion is bulged to the outer side so as to be formed thick.

In the case that the bellows portion 24 executes a bending motion in accordance with a solid angle motion of a coupling shaft of the universal shaft coupling, it is possible to lower a contact pressure between the crest portions of the bellows portion 24 in the separated portions 22. Accordingly, an abrasion phenomenon of the boot surface caused by an interference between the crest portions of the bellows portion at a time of the bending motion is not promoted. Therefore, a durability of the boot is extremely improved.

Figure 8:
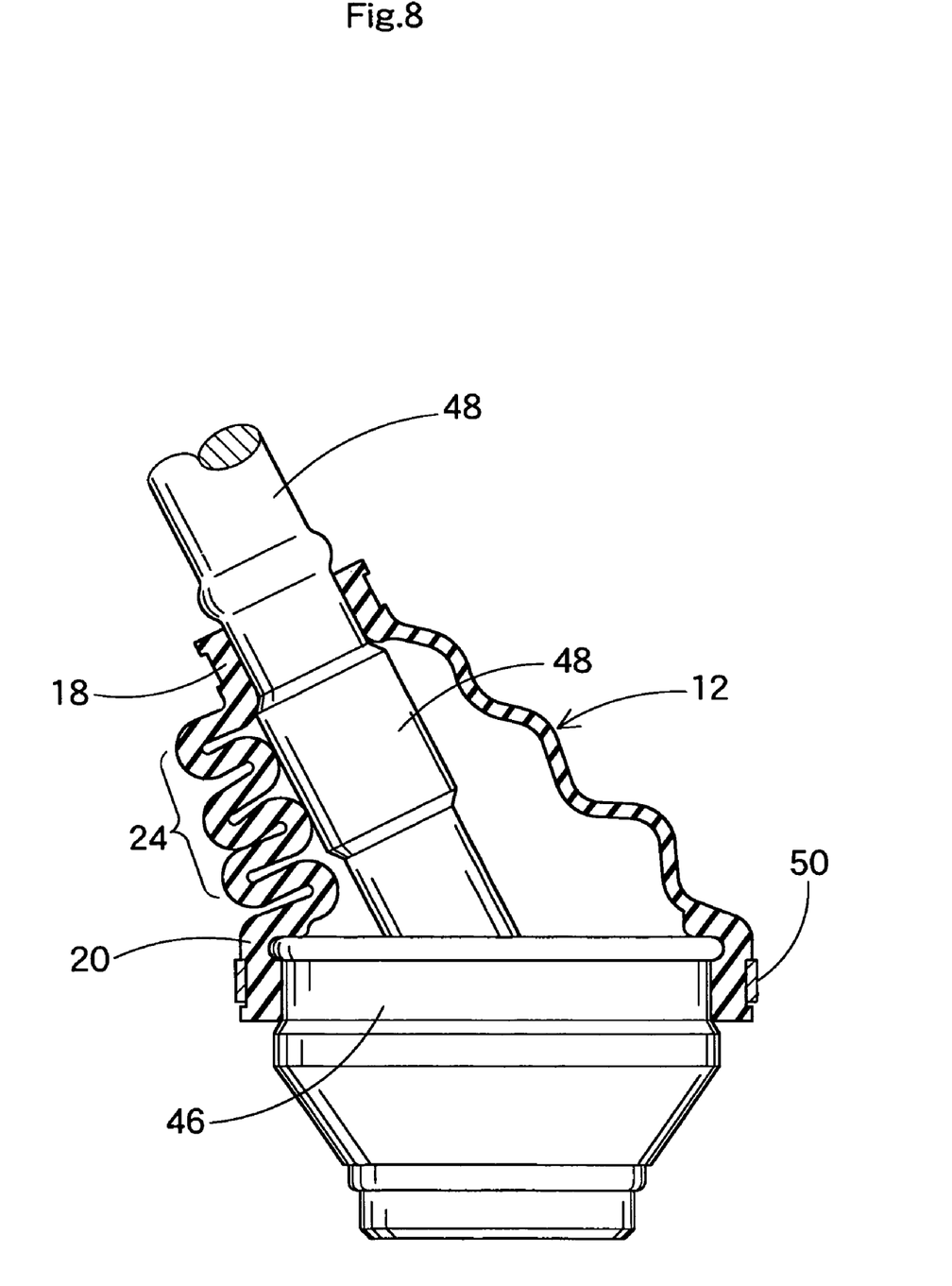
FIG. 8 is a cross sectional view showing an attached aspect of a boot for a universal shaft coupling to which the present invention is applied.

Next, a description will be given of a used aspect of the boot 12 in accordance with the embodiment mentioned above (refer to FIG. 8).

The large-diameter ring portion 20 is fitted and attached to a coupling housing 46 of the universal shaft coupling by occluding the occluding portion 32 to the occluded portion 34 from the expanded state shown in FIG. 1 so as to close the separated portions 22, and the boot 12 is assembled to the universal shaft coupling by fitting and attaching the small-diameter ring portion 18 to a coupling shaft 48. In this case, the grease is charged in a bearing portion (not shown) of the universal shaft coupling.

The occluding portion 32 of the separated portions 22 is sequentially pressed into the occluding groove 33 of the occluded portion 34 from the side of the large-diameter ring portion 20 or the side of the small-diameter ring portion 18 while gripping the occluding portion 32 of the separated portions 22 by hand. At this time, the occluding portion 32 is brought into contact with the guide surface 40 (40A and 40B) of the guide fin 36 (36A and 36B) formed in the separated portion end surface 22b so as to be positioned, and is caused to slide in the direction closing the fastener pair 26 along the guide surface 40 (40A and 40B). Accordingly, the bulge locking portion 32a of the occluding portion 32 can be introduced (guided) smoothly to the opening end surface of the occluding groove 33 formed in the occluded portion 34, and is introduced into the occluding groove 33.

The bulge locking portion 32a of the occluding portion 32 forcibly expands the portion between the opening end portions of the occluding groove 33 of the occluded portion 34 so as to be occluded with the keyhole-shaped occluding groove 33. At this time, because the pinched insert 37 is buried in the occluding portion 32, and the rigidity in the inserting direction is applied, the occluding workability is improved. Further, because the spring force is applied to the portion between the opening end portions of the occluding groove 33 in the closing direction, and the occluded portion 34 is formed by the rubber elastic body, the general portion of the occluding portion 32 is pinched between the opening end portions of the occluding groove in a close contact state, so that a sealing function is applied to the occluding portion and a large come-off preventing force is generated.

Further, the large-diameter ring portion 20 is normally fixed securely by a metal fastening band 50. At this time, it is desirable in view of an improvement of the occluding workability and the sealing performance of the occluding portion to execute the occluding work while applying a silicone oil to one or both of the occluding portion 32 and the occluded portion 34.

Further, in order to replace the boot after using for a long time, the occluding state between the occluding portion 32 and the occluded portion 34 is forcibly canceled by detaching the fastening band 50 of the large-diameter ring portion 20, gripping both end portions of the separated portion of the large-diameter ring portion 20 by hand, and applying the force so as to tear from the side of the large-diameter ring portion 20 to both sides. Accordingly, the boot can be attached and detached in the expanded state. Further, it is possible to maintain a state in which the sealing performance is secured better due to the existence of the guide fin 36, at a time of the bending motion of the boot.

Second Embodiment

The present embodiment is structured such that a grease leakage inhibiting function is further added to the first Embodiment mentioned above. In the following description, reference numerals are constituted by three digit numbers obtained by adding prefix number "1" to the reference numerals in the first Embodiment mentioned above, and with respect to the common parts with the first Embodiment, all or a part of the description thereof will be omitted.

Figure 9:
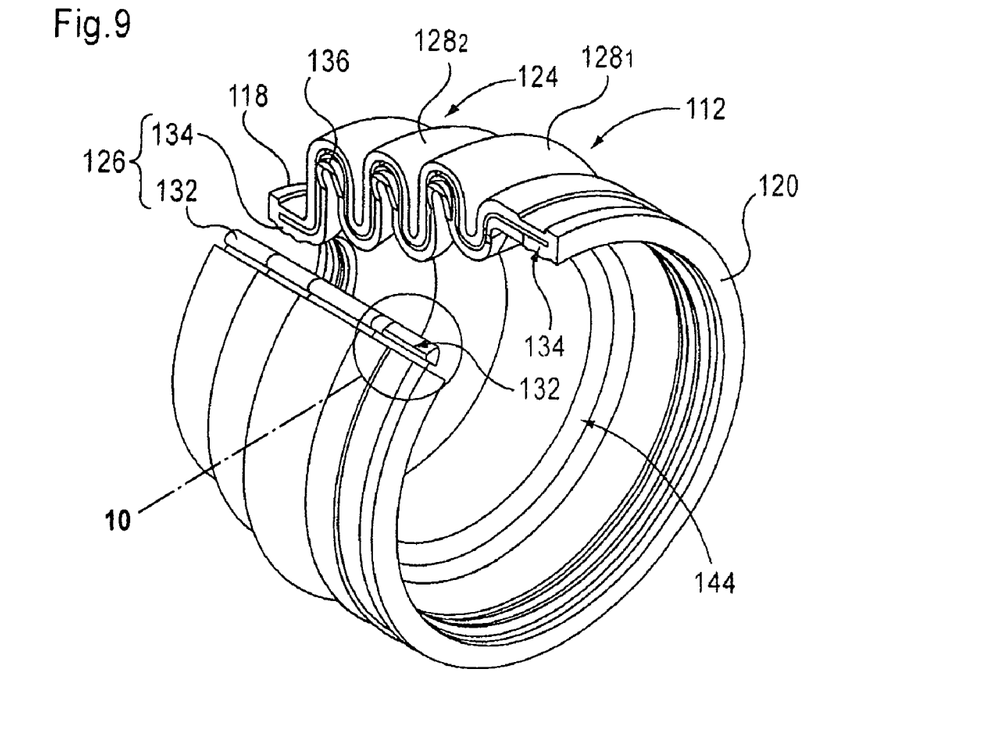
FIG. 9 is a perspective view showing another embodiment (an embodiment 2) of the boot in accordance with the present invention.
Figure 10:
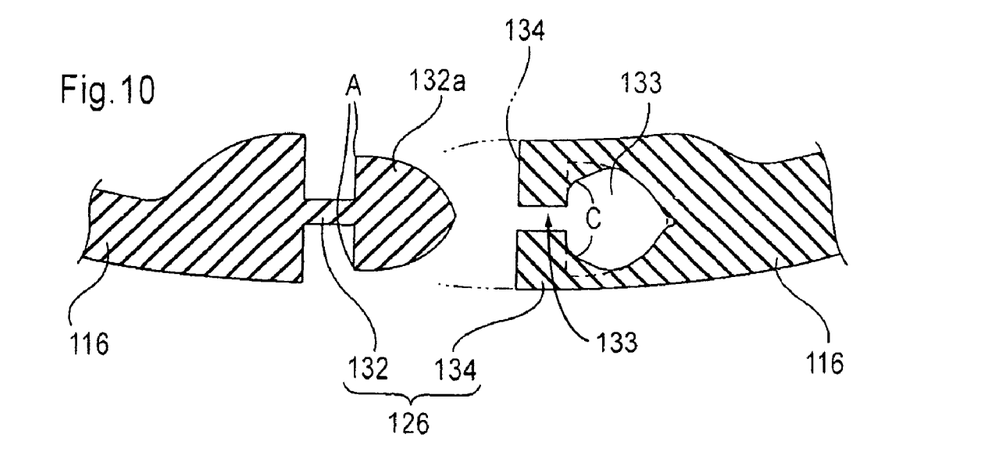
FIG. 10 is an enlarged end elevational view before being occluded, showing a fastener pair forming portion in a portion 126 in FIG. 9.

A boot 112 in accordance with the present embodiment is structured such that in the boot in accordance with the first Embodiment, a grease return rib 144 is formed in an inner peripheral surface of the first valley portion, and the shape of the bulge locking portion 132a of the occluding portion is formed in a so-called arrow-head cross-sectional shape in which both sides of a base portion is angular while maintaining the shape of the occluded portion (refer to FIGS. 9 and 10). A description will be provided in detail given below.

The grease return rib 144 may be partially (discontinuously) formed, however, it is desirable that the grease return rib 144 is formed continuously all around the inner peripheral surface of the first valley portion.

The grease is normally charged in the bearing portion (shaft receiving portion) of the universal shaft coupling. Accordingly, when the boot 112 is attached and used, the grease intrudes into the inner side of the boot from the side of the large-diameter ring portion 120. The grease intruding into the inner portion of the boot moves along the inner surface of the boot 112, and moves to a bellows portion 124. In the case that the grease return rib 144 is formed as in the present embodiment, it is possible to inhibit the grease from intruding into the inner portion of the boot 112 (a first crest portion $128_1$ of the bellows portion 124) from the side of the large-diameter ring portion 120 in comparison with the conventional structure.

As a protruding height of the grease return rib 144, the height about 1.0 to 2.5 mm is desirable because a use demand characteristic can be satisfied. If the protruding height is too low, it is difficult to effectively inhibit the grease from intruding into the inner portion of the boot 112, and if the protruding height is too high, there is a risk that an interference with the coupling shaft of the universal shaft coupling region covered at a time of attaching and using the boot is generated.

In this case, a thickness t of the grease return rib 114 is set from about 1.5 to 3.0 mm. If the thickness is too thin, it is difficult to achieve the operation of the grease return rib, and if the thickness is too thick, there is a risk that a bendability (flexibility) of the boot bellows portion is inhibited.

Figure 11:
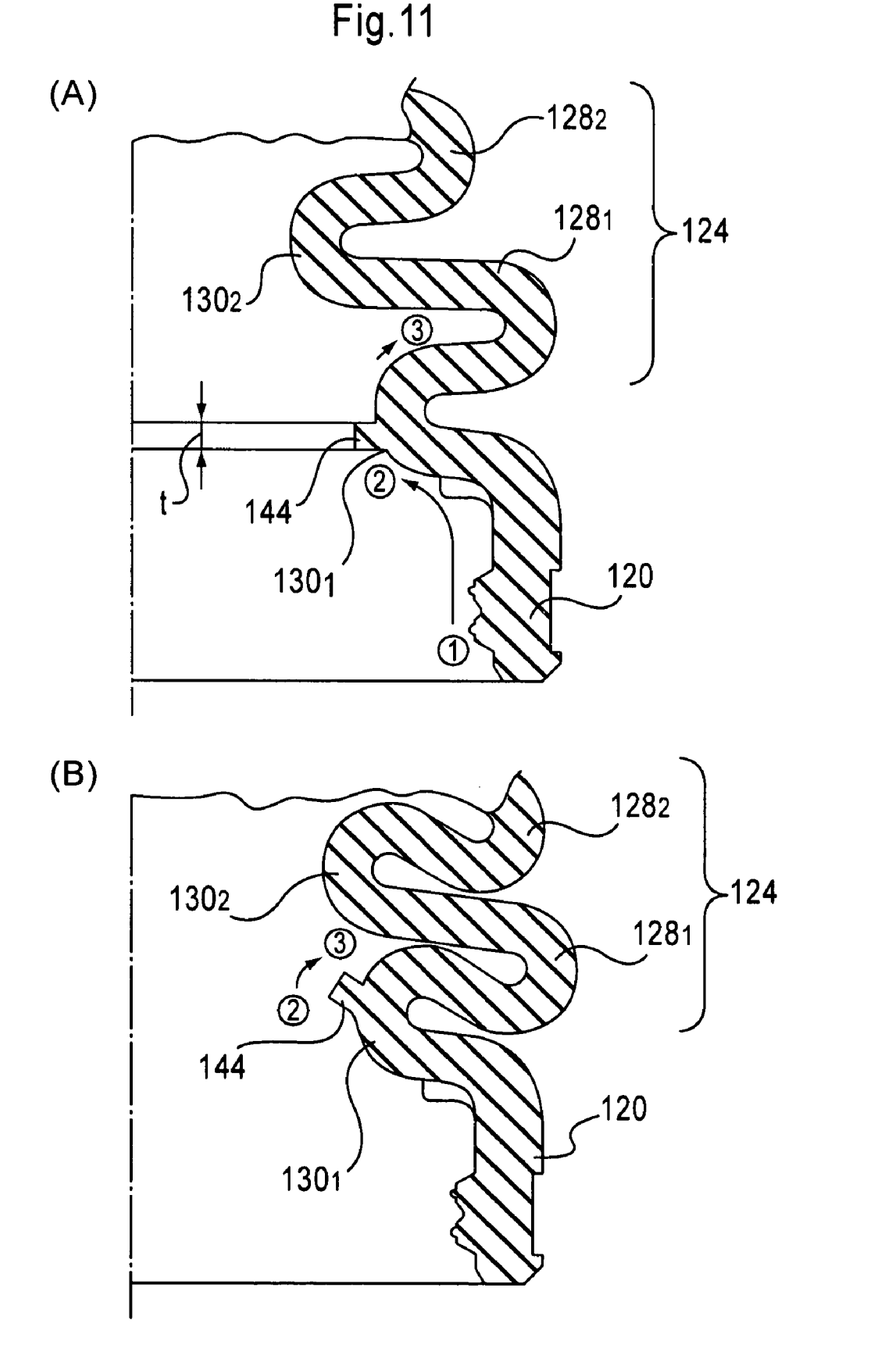
FIG. 11A is a cross sectional view of a main portion before bending the bellows portion, showing a grease movement within the boot in accordance with the embodiment 2.
FIG. 11B is a cross sectional view of a main portion after bending the bellows portion in the same manner.

In the case that the grease intrudes into the inner portion of the boot from the side of the large-diameter ring portion 120, the grease moves along the inner surface of the large-diameter ring 120 of the boot 112 as shown in FIG. 11A (position (1)). The grease is inhibited from intruding into the side of the bellows portion 124 at a certain degree by the grease return rib 144 formed in an inner peripheral surface of a first valley portion $130_1$ of the bellows portion 124 (position (2)). However, in the case that an amount of the grease is excessive or the case that the boot 112 is in the bent state as shown in FIG. 11B, the grease intrudes into the bellows portion 124 side over the grease return rib 144. Thereafter, the grease sometimes moves concentrically to inner peripheral surfaces of the crest portions $128_1$ and $128_2$ from a rotating shaft, on the basis of a centrifugal force generated by a rotating motion of the boot 112 (position (3)).

In this case, in a fastener pair 126 constituted by an occluding portion 132 and an occluded portion 134, an engagement of a fastener pair 126 is achieved by the following structure. In other words, both side cross sections of a base portion of a bulge locking portion 132a in the occluding portion 132 are formed as corner portions A, and both side cross sections of a base portion of a bulge receiving portion 133a in an occluded groove 133 corresponding to the bulge locking portion 132a in the occluded portion 134 are formed as curved portions C, thereby compressing the corner portions A and A. In accordance with the structure mentioned above, when the occluding portion 132 and the occluded portion 134 are occluded, the corner portions A in both sides of the base portion in the bulge locking portion 132a of the occluding portion 132 are compressed by the curved portions C in both sides of the base portion of the bulge receiving portion 133a of the occluded groove 133, whereby a sealing performance in the fastener pair 126 can be held. In other words, the present embodiment can reduce a possibility of the grease concentration and the grease leakage due to a pumping effect.

A use aspect of the boot 112 in accordance with the present embodiment 2 is the same as that of the first Embodiment, however, the following function is added.

Because the boot 112 in accordance with the present embodiment is provided with the grease return rib 144, it is possible to inhibit the grease from being concentrated in the occluding fastener pair 126. Further, in the fastener pair 126 formed by occluding the occluding portion 132 with the occluded portion 134 as mentioned above, because the corner portions A in both sides of the base portion of the bulge locking portion 132a in the occluding portion 132 are compressed by the curved portions C in both sides of the base portion of the bulge receiving portion 133a of the occluded groove 133 in the occluded portion 134, it is possible to inhibit the grease from leaking out (oozing out) to the outer portion, even if the grease leaks over the inhibition caused by the guide fin 136.

In this case, the description is given above on the basis of the boot having the structure provided with the guide fin in accordance with the first Embodiment, however, a technical scope of the present invention is not limited to this. In other words, the object of the present invention (for preventing the grease from leaking from the fastener pair (seal portion)) can be achieved by a structure in which the grease return rib is formed in the inner surface of the first valley portion in the structure having no guide fin in the first Embodiment, and a structure in which both side base portions of the bulge locking portion are formed angular in the structure mentioned above.

The invention claimed is:

1. A boot for a universal shaft coupling formed by a rubber elastic body, and forming a bellows portion between a small-diameter ring portion and a large-diameter ring portion, wherein linear separated portions are formed along a generatrix from the small-diameter ring portion to the large-diameter ring portion, both sides of said separated portions are formed thick, and a fastener pair is arranged in said separated portions, and a portion between said separated portions is thinner than said separated portions and is formed in a substantially uniform thickness so as to form a general portion connected in a peripheral direction, wherein said fastener pair is constituted by a band-like first occluding portion formed along one end edge of said separated portions and provided with a bulge locking portion in a leading end, and a band-like second occluding portion provided with a occluding groove occluding with said first occluding portion along another end edge of said separated portions, and wherein both side cross sections of a base portion of the bulge locking portion in said first occluding portion are formed as angular portions, and both side cross sections of a base portion of a bulge receiving portion in the occluding groove corresponding to said bulge locking portion in said second occluding portion are formed as curved portions compressing said angular portions.

2. A boot for a universal shaft coupling as claimed in claim 1, wherein a guide fin provided with a guide surface at a position partly overlapping the first occluding portion at a time of the first occluding portion facing to said second occluding portion, is formed so as to protrude only to each crest portion side of said bellows portion, in an inner side of said occluding groove on an end surface of the second occluding portion of said separated portions.

3. A boot for a universal shaft coupling as claimed in claim 2, wherein each of said separated portions is bulged to the inner side so as to be formed as a thick portion.

4. A boot for a universal shaft coupling as claimed in claim 2, wherein a grease return rib is provided in a first inner peripheral surface in a side of said large-diameter ring portion.

5. A boot for a universal shaft coupling as claimed in claim 1, wherein each of said separated portions is bulged to the inner side so as to be formed as a thick portion.

6. A boot for a universal shaft coupling as claimed in claim 1, wherein a grease return rib is provided in a first inner peripheral surface in a side of said large-diameter ring portion.

* * * * *